US007172806B2

(12) United States Patent
Takazawa et al.

(10) Patent No.: US 7,172,806 B2
(45) Date of Patent: Feb. 6, 2007

(54) MONOLITHIC CERAMIC ELECTRONIC COMPONENT

(75) Inventors: Tomoo Takazawa, Fukui (JP); Takehiko Otsuki, Omihachiman (JP); Toshio Kawabata, Yokaichi (JP); Kaoru Tachibana, Shiga-ken (JP)

(73) Assignee: Murata Manufacturing Co., Kyoto (JP)

( * ) Notice: Subject to any disclaimer, the term of this patent is extended or adjusted under 35 U.S.C. 154(b) by 19 days.

(21) Appl. No.: 10/865,513

(22) Filed: Jun. 10, 2004

(65) Prior Publication Data

US 2005/0013083 A1 Jan. 20, 2005

(30) Foreign Application Priority Data

Jul. 14, 2003 (JP) ............................ 2003-196526

(51) Int. Cl.
*B32B 3/00* (2006.01)
*H01G 4/06* (2006.01)

(52) U.S. Cl. .................. 428/210; 361/315; 361/321.5; 428/307.3

(58) Field of Classification Search ........ 361/311–315, 361/321.5; 428/210, 307.3
See application file for complete search history.

(56) References Cited

U.S. PATENT DOCUMENTS 3,679,950 A * 7/1972 Rutt ........................ 361/321.4
5,686,172 A * 11/1997 Ohya et al. .............. 156/89.28
6,252,481 B1 * 6/2001 Iwao et al. .................... 336/83
6,762,925 B2 * 7/2004 Uchida et al. ........... 361/321.1
6,924,972 B2 * 8/2005 Takazawa ................ 361/321.2

FOREIGN PATENT DOCUMENTS

| | | |
|---|---|---|
| JP | 55-52300 | 4/1980 |
| JP | 62-026886 A | 2/1987 |
| JP | 03-108396 A | 5/1991 |
| JP | 05-326136 | 12/1993 |
| JP | 07-240334 | 9/1995 |
| JP | 11-067575 | 3/1999 |

OTHER PUBLICATIONS

Official Communication cited in corresponding Japanese Patent Application No. 2003-196526, dated Jun. 27, 2006.

* cited by examiner

*Primary Examiner*—Cathy F. Lam
(74) *Attorney, Agent, or Firm*—Keating & Bennett, LLP

(57) ABSTRACT

A sintered ceramic has a porosity of greater than about 30 percent and less than about 80 percent by volume. Pores are filled with an epoxy resin. A filling factor of the epoxy resin is about 40 percent by volume or more. A monolithic ceramic electronic component having an inner electrode, for example, a chip inductor is manufactured with such a porous sintered ceramic. When a direct current is superimposed, the resulting monolithic ceramic electronic component has a substantially unchanged self-resonant frequency and also has a rate of decrease in impedance of about 50 percent or less at 100 MHz.

7 Claims, 9 Drawing Sheets

MONOLITHIC CERAMIC ELECTRONIC COMPONENT

BACKGROUND OF THE INVENTION

1. Field of the Invention

The present invention relates to monolithic ceramic electronic components, and more particularly, the present invention relates to inductors, LC combined electronic components, LR combined electronic components, and LCR combined electronic components, which can operate at high frequencies.

2. Description of the Related Art

In recent years, electronic devices operating at high frequencies have become common. Inductors, LC combined components, LR combined components, LCR combined components, and the like, which can operate at gigahertz (GHz) frequencies, have become necessary.

However, in an inductor for high-frequency operation, stray capacitance occurring in parallel with the inductor seriously affects the impedance of the inductor. In particular, at GHz frequencies, small stray capacitance, in the range of 0.01 pF to 0.1 pF, seriously affects the impedance. Consequently, to achieve the desired characteristics by decreasing the stray capacitance, it is necessary to decrease the dielectric constant $\epsilon$ of ferrite for a magnetic material. Unfortunately, decreasing the dielectric constant $\epsilon$ of ferrite, for example, down to 14 or less, is difficult practically because of the structure of ferrite.

Thus, a method for decreasing the dielectric constant by mixing a magnetic material with a material such as a resin and glass having a low dielectric constant is suggested. In such a magnetic composite that is composed of a magnetic material and a non-magnetic material such as a resin and glass, the particles of the magnetic material are covered with the non-magnetic material to interrupt a magnetic path. As a result, permeability is decreased dramatically.

Japanese Unexamined Patent Application No. 55-52300 discloses porous sintered ferrite having a porosity of 20% to 70% for an electromagnetic wave absorber, the porous sintered ferrite having a low dielectric constant because of its high porosity. Japanese Unexamined Patent Application No. 11-67575 discloses a ceramic electronic component provided with ceramic and an inner electrode disposed within the ceramic, the ceramic having pores with a diameter of 1 μm to 3 μm and having a porosity of 3 to 30 percent by volume.

Such a porous sintered ferrite has a low dielectric constant because of its high porosity, thus improving impedance characteristics at high frequencies. In addition, since such a porous sintered ferrite has continuous magnetic paths, the electromagnetic properties of the porous sintered ferrite do not vary significantly.

However, in a typical chip inductor composed of a non-porous ceramic body, superimposing a direct current impairs the impedance characteristics at lower frequencies than its self-resonant frequency and causes a change in the self-resonant frequency. Hence, even if the self-resonant frequency without the superimposed direct current is adjusted to noise frequencies, noise cannot be effectively removed because of the change in the self-resonant frequency. FIG. 4 shows that the rate of change in impedance at 100 MHz with a superimposed direct current of 100 mA relative to that without a superimposed direct current is −60.9%.

On the other hand, in a chip inductor composed of a porous ceramic body, the self-resonant frequency does not change by superimposing a direct current, but the impedance is significantly decreased. FIG. 5 shows that the rate of change in the impedance at 100 MHz with the superimposed direct current of 100 mA relative to that without the superimposed direct current is −57.4%.

SUMMARY OF THE INVENTION

In order to overcome the problems described above, preferred embodiments of the present invention provide a monolithic ceramic electronic component having a substantially unchanged self-resonant frequency and a suppressed rate of decrease in impedance, when a low direct current is superimposed.

A monolithic ceramic electronic component according to a preferred embodiment of the present invention includes a ceramic body and an inner electrode provided in the ceramic body, the ceramic body having pores, at least approximately 40 percent of the total volume of the pores being filled with a resin.

A monolithic ceramic electronic component according to a preferred embodiment of the present invention has a low dielectric constant because of its porous ceramic body. As a result, impedance characteristics are improved at high frequencies, and variations in electromagnetic characteristics decrease. Furthermore, when a direct current is superimposed, the monolithic ceramic electronic component has a small variation in self-resonant frequency and has a rate of decrease in impedance of about 50% or less.

Since magnetic grains are discontinuously disposed due to the pores in the ceramic body, the movement of magnetic domain walls induced by a magnetic field produced by a current is blocked. As a result, magnetization saturation is difficult to reach. Hence, the impedance characteristics are improved, and a variation in self-resonant frequency decreases. In addition, at least approximately 40 percent of the total volume of the pores is filled with a resin. Curing the resin produces residual stress, causing strain that prevents magnetic saturation. Consequently, the decrease in impedance with the superimposed direct current is suppressed.

In the monolithic ceramic electronic component according to a preferred embodiment of the present invention, the ceramic body is preferably composed of ferrite, and the pores are preferably filled with an epoxy resin.

The ceramic body preferably has a porosity of greater than approximately 30 percent and less than approximately 80 percent by volume, resulting in a reduction in the dielectric constant without causing a decrease in the strength of the ceramic body. A ceramic body having a porosity of about 30 percent by volume or less does not have a sufficiently low dielectric constant. The ceramic body preferably has a porosity of about 35 percent by volume or more. In the case of a porosity of over approximately 80 percent by volume, green sheets are difficult to manufacture.

Furthermore, the pores in the ceramic body are preferably formed by firing the mixture of a ceramic material, a binder, and a combustible substance that can adhere to the binder, the combustible substance being spherical or powdery. The monolithic ceramic electronic component including such a ceramic body has desired electromagnetic characteristics, low stray capacitance, and high reliability.

Other features, elements, characteristics and advantages of the present invention will become more apparent from the following detailed description of preferred embodiments thereof with reference to the attached drawings.

DETAILED DESCRIPTION OF PREFERRED EMBODIMENTS

A preferred embodiment of a monolithic ceramic electronic component according to the present invention will now be described below with reference to the drawings.

Figure 1:
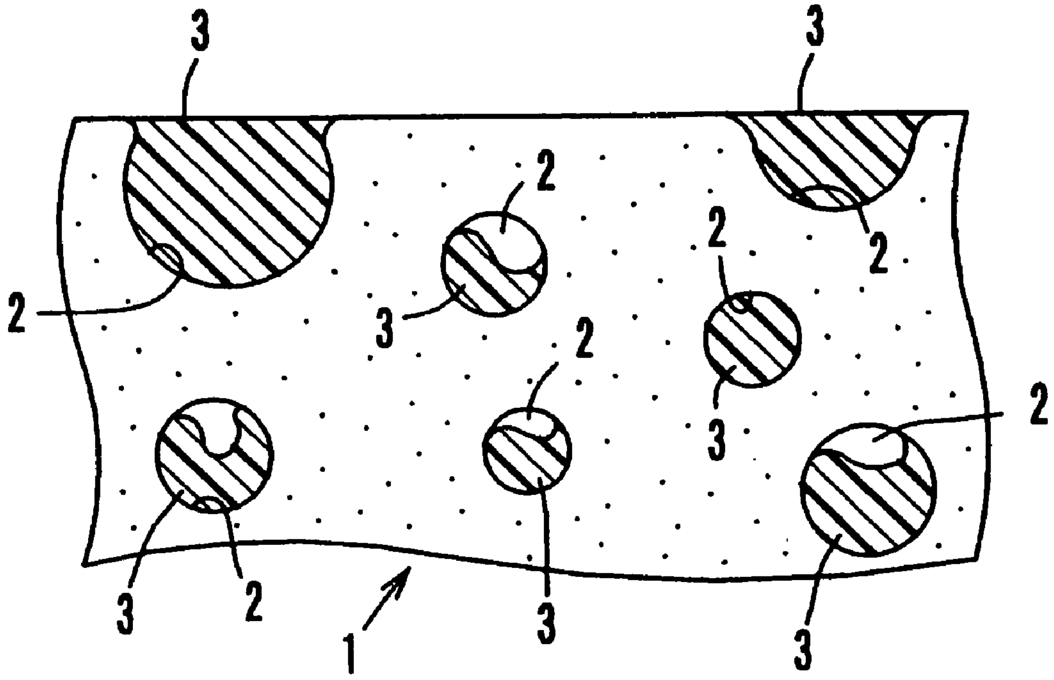
FIG. 1 is a schematic cross-sectional view illustrating the internal structure of a sintered ceramic according to a preferred embodiment of the present invention.

Referring to FIG. 1, a sintered ceramic constituting the monolithic ceramic electronic component will be described.

A plurality of pores 2, which are filled with a resin 3, are provided in a sintered ceramic 1. The pores 2 preferably have an average diameter of about 5 μm to about 20% m. The pores 2 also have two structures, that is, open pores and closed pores. The sintered ceramic 1 preferably has a porosity of greater than about 30 percent and less than about 80 percent by volume. In the monolithic ceramic electronic component according to a preferred embodiment of the present invention, at least approximately 40 percent of the total volume of the pores 2 are filled with the resin 3.

To evaluate the effect of the pores and the resin, samples 1 to 6 (chip inductors) were manufactured. Sample 1 is composed of a non-porous sintered ceramic. Sample 2 is composed of a sintered ceramic having pores that are not filled with a resin. Samples 3, 4, 5, and 6 are composed of a sintered ceramic having pores that are filled with the resin, each of the samples having a filling factor of approximately 25, 40, 50, and 75 percent of the total volume of the pores, respectively. These samples 1 to 6 were prepared by the following process. Then, the impedance characteristics of the samples 1 to 6 were measured. Resulting measurements will be described in detail later in this section.

The porosity of the sintered ceramic is determined by the following equation:

$$\text{Porosity}=\{1-(X/Y)/Z\}\times 100 \text{ (percent by volume)} \quad (1)$$

where X is the weight of the sintered ceramic; Y is the volume of the sintered ceramic; and Z is the theoretical density of the sintered ceramic.

The porosity of the sintered ceramic determined by equation (1) results from pores that are intentionally formed by a combustible substance and unintentional pores that are necessarily formed by sintering.

The filling factor (percent by volume) of the resin for the total volume of the pores is determined as follows: The porosity of the sintered ceramic before resin impregnation is given by equation (1). Next, the total volume of the resin in the pores is calculated from the increased weight of the sintered ceramic after resin impregnation, the volume of the sintered ceramic, and the specific gravity of the resin. And then, the calculated total volume of the resin is divided by the total volume of the pores. As a result, the filling factor is determined.

A preferred embodiment of a process for manufacturing a sintered ceramic will now be described below.

Predetermined amounts of oxide materials, for example, nickel oxide, zinc oxide, copper oxide are mixed and calcined at a temperature of about 800° C. for approximately an hour. Then, the resulting mixture is ground by ball-milling followed by drying, to prepare a ferrite material (mixed oxide powder) having an average particle size of about 2 μm.

The resulting mixed oxide powder is mixed with organic materials, that is, a binder, a dispersant, a solvent, and a commercially available spherical polymer (a combustible substance) into a slurry, the spherical polymer being added to achieve a predetermined porosity (e.g., about 35 percent by volume). Then, ceramic green sheets having a thickness of about 40 μm are manufactured with the resulting slurry by a doctor blade process.

The spherical polymer used as the combustible substance has a large surface area, shape stability, and excellent adhesion properties to the binder. The use of such a spherical polymer can decrease the content of the binder in the slurry and can increase the content of the spherical polymer without reducing the yield. As a result, the green sheets have high porosity.

Inner electrodes having predetermined patterns and via holes are formed with a conductive paste on the ceramic green sheets. The resulting ceramic green sheets are laminated and crimped, and then cut into pieces having a predetermined size.

The resulting laminates are subjected to heat treatment, i.e., debinder treatment, at a temperature of about 400° C. for approximately three hours and subsequent heat treatment at a temperature of about 925° C. for approximately two hours, to prepare a sintered ceramic having a porosity of about 35 percent by volume. The porosity can be adjusted by changing the amounts of the organic materials, particularly the combustible substance in the slurry.

The laminates are immersed in an epoxy resin solution having a predetermined viscosity adjusted by mixing in an organic solvent, the epoxy resin having a dielectric constant of about 3.4. In this way, the pores are impregnated with the epoxy resin. Then, the resin that has adhered to the surfaces of the laminates is removed. The laminates are subjected to heat treatment at a temperature of about 150° C. to about 180° C. for approximately two hours in order to cure the epoxy resin.

Figure 2:
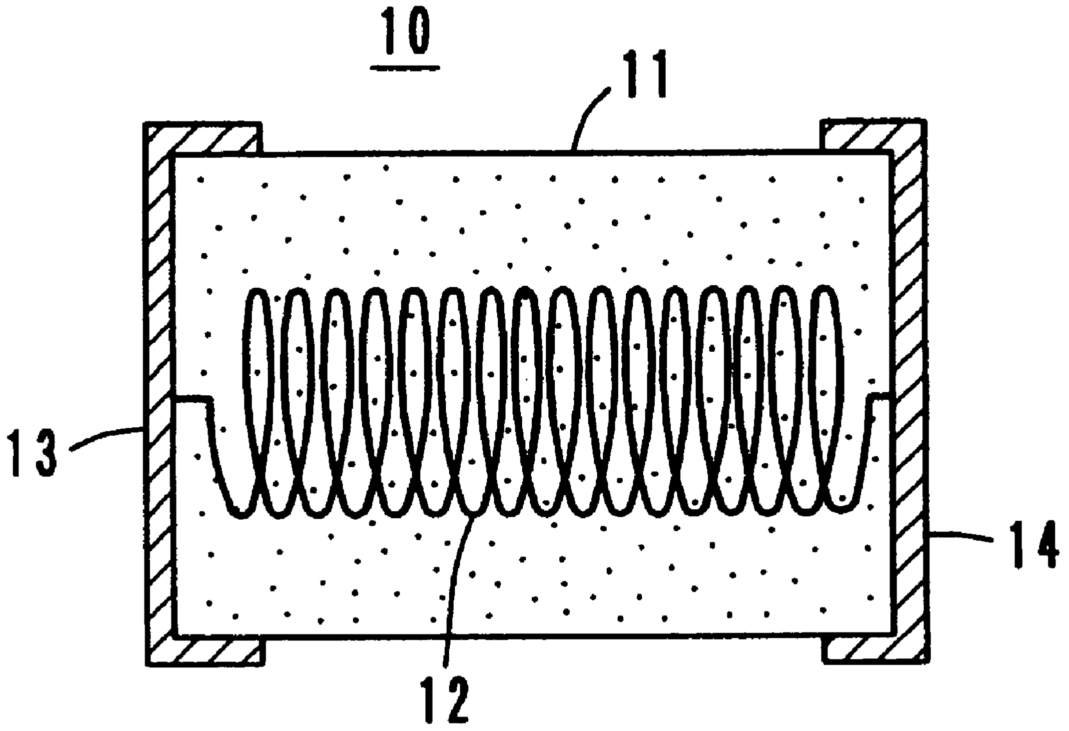
FIG. 2 is a cross-sectional view illustrating a chip inductor composed of the sintered ceramic.

FIG. 2 shows the structure of a chip inductor 10 manufactured by the process described above. The chip inductor 10 includes a coil 12 disposed in a sintered ceramic 11 and outer electrodes 13 and 14 provided at the edges of the sintered ceramic 11. The coil 12 has 30 turns.

Figure 3:
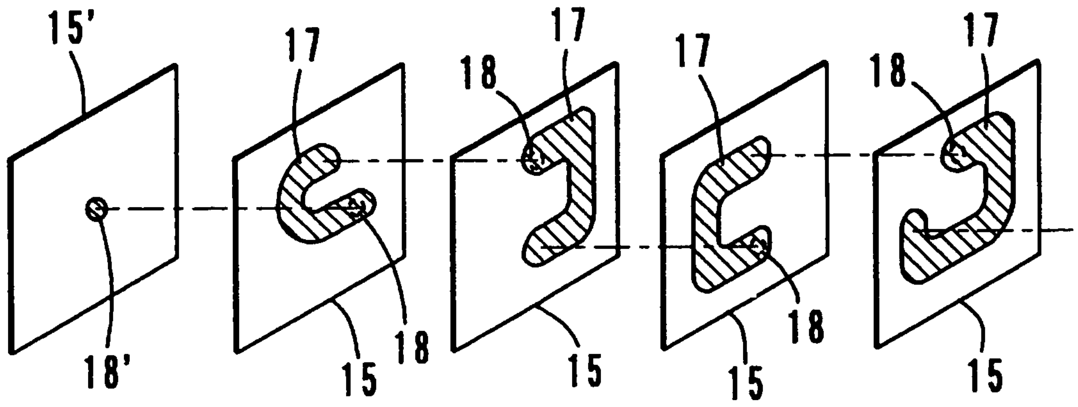
FIG. 3 is an exploded perspective view partially illustrating the chip inductor.

As shown in FIG. 3, the coil 12 has a known structure in which predetermined conductive patterns 17 disposed on ceramic green sheets 15 are electrically connected to each other through via holes 18 that are provided at an end of each of the conductive patterns 17. The ends of the coil 12 are electrically connected to respective outer electrodes 13 and 14 through via holes 18' provided in ceramic green sheets 15'.

For each of the samples 1 to 6 of the chip inductors having such a structure, the relationships between impedance and frequency were examined with and without a superimposed direct current of approximately 100 mA. The rate of change in impedance of each sample is calculated from the values of impedance of the same sample at 100 MHz with and without a superimposed direct current of approximately 100 mA. The impedance curves are shown in FIGS. 4 to 9. The rate of change in impedance of each sample is shown in Table 1.

Self-resonance frequency f is determined by the following equation:

$$f=1/\{2\pi\sqrt{(LC)}\}$$

A decrease in inductance L causes the self-resonant frequency to shift to higher frequencies. Since magnetic grains are discontinuously disposed due to the pores in the ferrite, the magnetic domain walls hardly move in the presence of a superimposed direct current. Thus, magnetization saturation is difficult to reach. Consequently, the inductance L does not decrease in the presence of a superimposed direct current. As a result, the self-resonant frequency does not change.

TABLE 1

| Sample No. | Porosity (vol %) | The filling factor of the resin (vol %) | Impedance at 100 MHz without a superimposed direct current (Ω) | Impedance at 100 MHz with a superimposed direct current of 100 mA (Ω) | The rate of change in impedance (%) |
|---|---|---|---|---|---|
| 1 | 0 | 0 | 483 | 189 | −60.9 |
| 2 | 35 | 0 | 685 | 292 | −57.4 |
| 3 | 35 | 25 | 471 | 221 | −53.1 |
| 4 | 35 | 40 | 384 | 223 | −42.4 |
| 5 | 35 | 50 | 374 | 231 | −38.2 |
| 6 | 35 | 75 | 271 | 171 | −36.9 |

Figure 4:
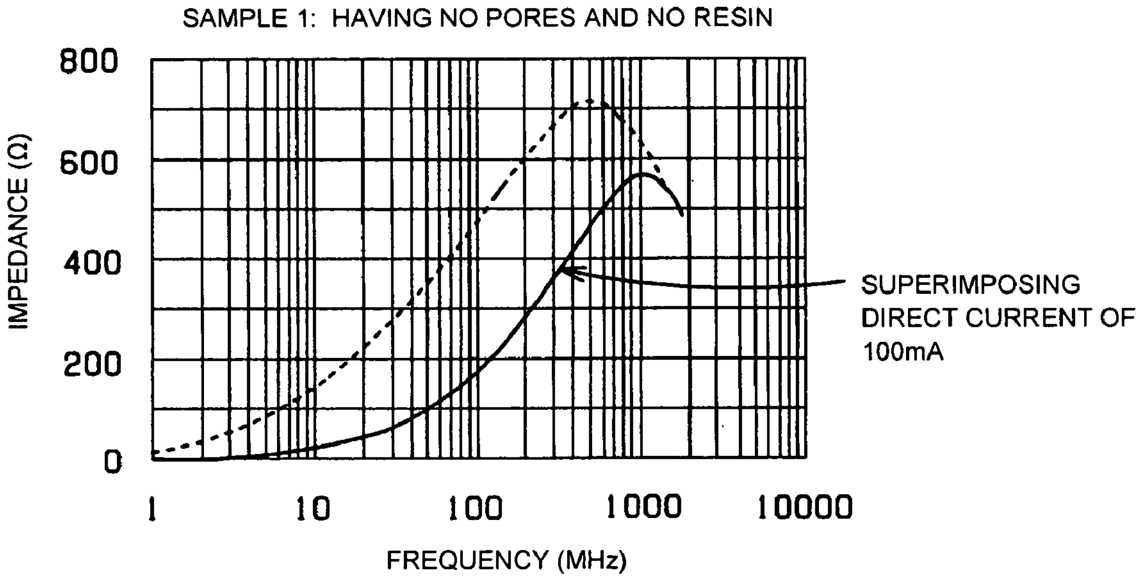
FIG. 4 PRIOR ART
FIG. 4 is a graph showing the relationship between impedance and frequency of sample 1 (a comparative example)

As is evident from Table 1, for sample 1, which has no pores and no resin, the rate of change in impedance is −60.9%. The self-resonant frequency of sample 1 significantly shifts as shown in FIG. 4.

Figure 5:
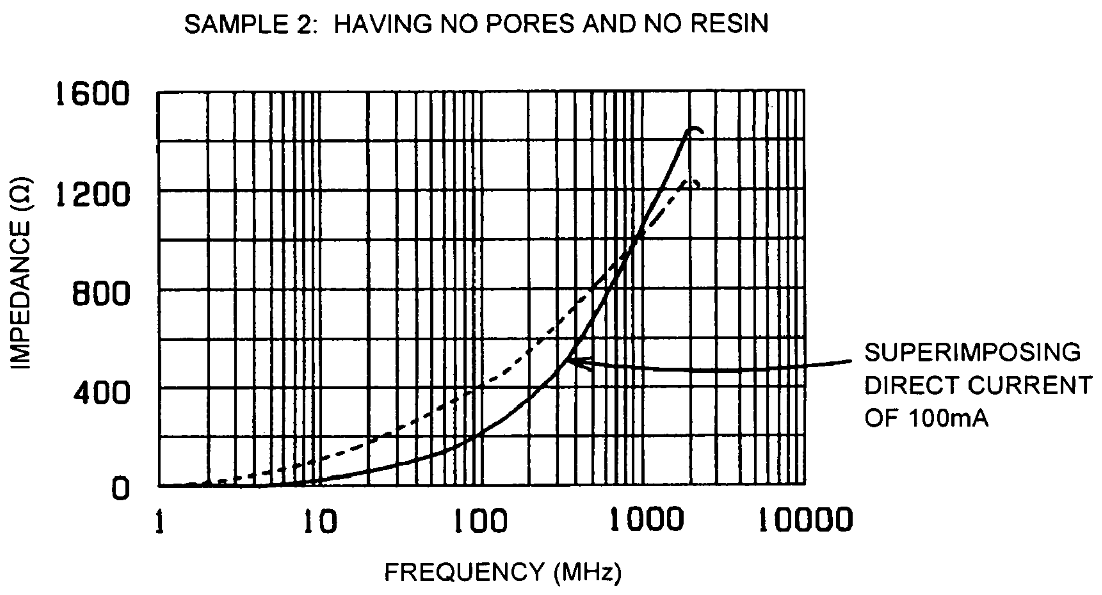
FIG. 5 PRIOR ART
FIG. 5 is a graph showing the relationship between impedance and frequency of sample 2 (a comparative example)

For sample 2, which has a porosity of 35 percent by volume but no resin in the pores, the rate of change in impedance is −57.4%. The self-resonant frequency of sample 2 does not substantially shift as shown in FIG. 5.

Figure 6:
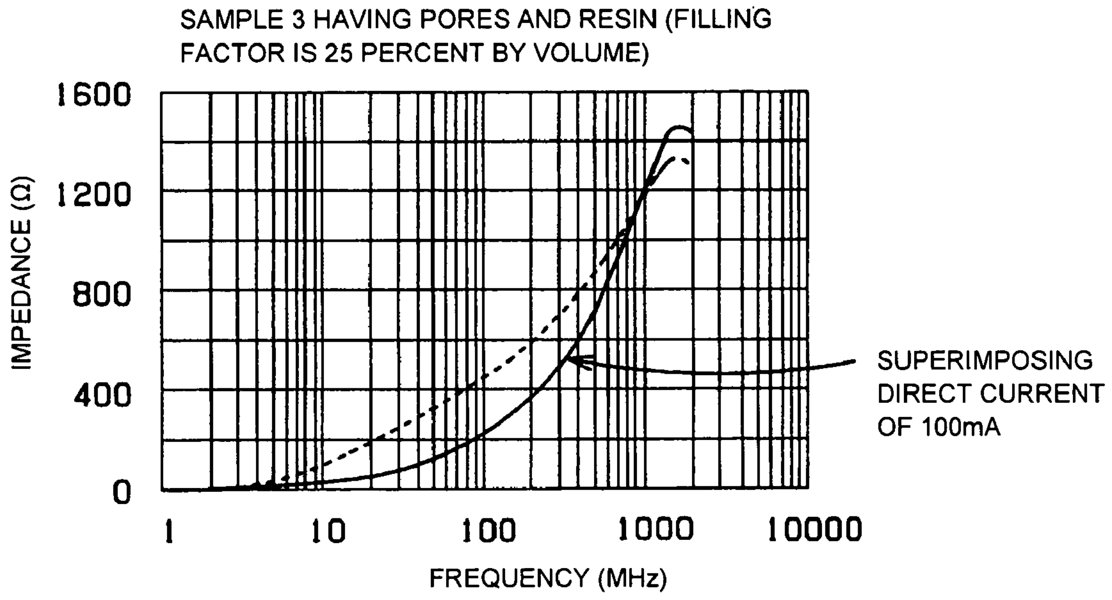
FIG. 6 is a graph showing the relationship between impedance and frequency of sample 3 (a comparative example)

For sample 3, which has a porosity of 35 percent by volume and a filling factor of 25 percent by volume, the rate of change in impedance is −53.1%. The self-resonant frequency of sample 3 does not substantially shift as shown in FIG. 6.

Figure 7:
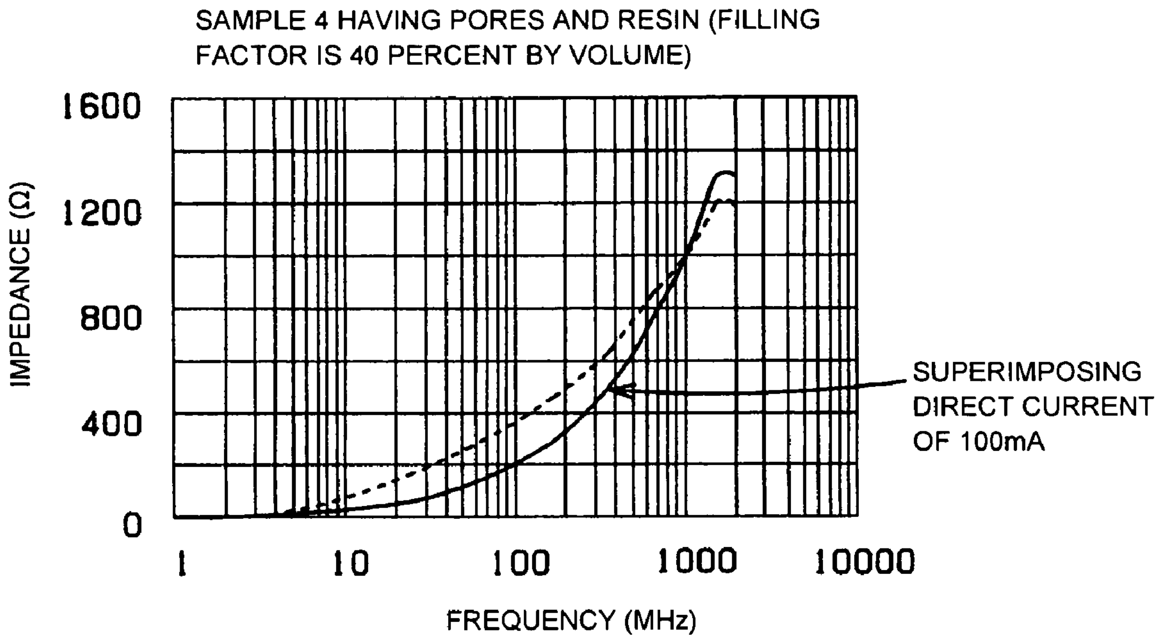
FIG. 7 is a graph showing the relationship between impedance and frequency of sample 4 (a present example)
Figure 8:
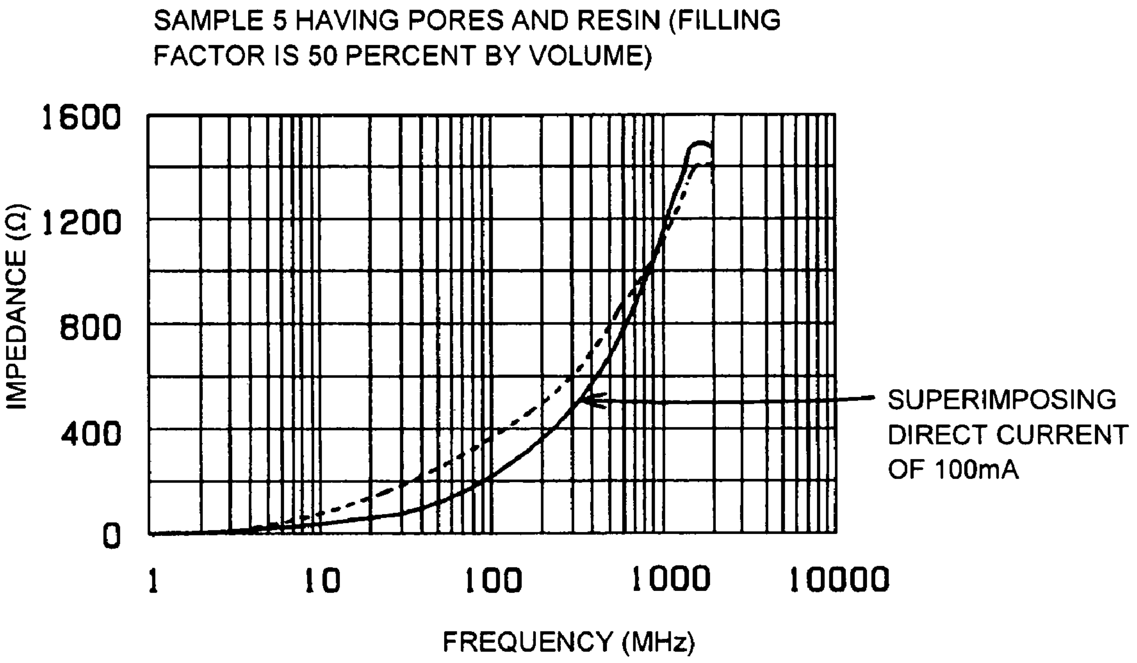
FIG. 8 is a graph showing the relationship between impedance and frequency of sample 5 (a present example)
Figure 9:
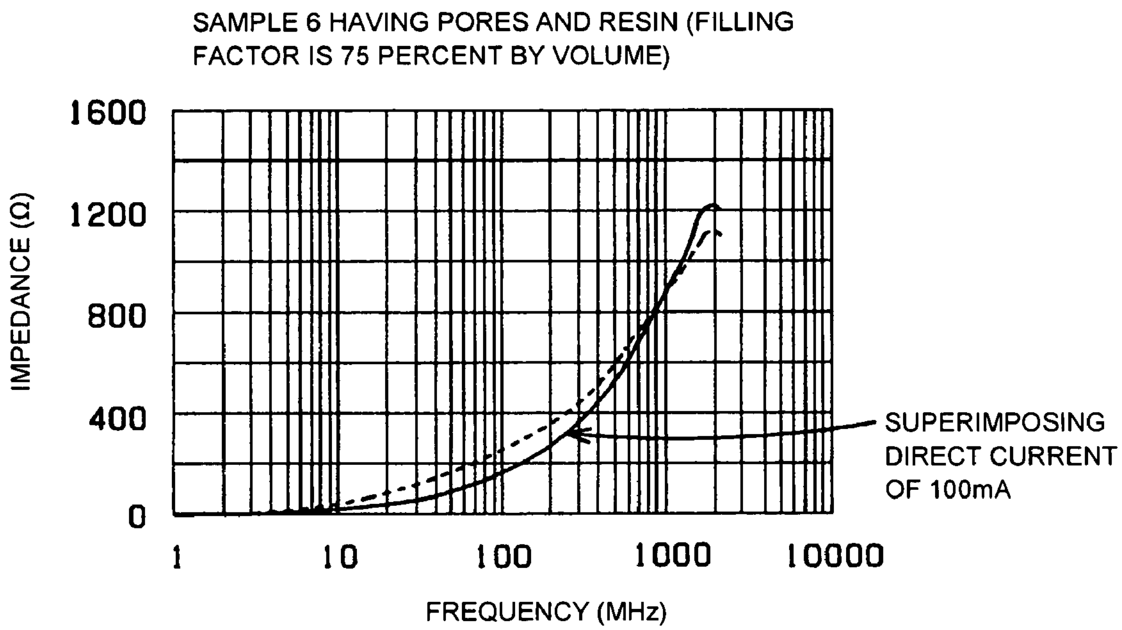
FIG. 9 is a graph showing the relationship between impedance and frequency of sample 6 (a present example).

For samples 4, 5, and 6, which all have a porosity of 35 percent by volume and have a filling factor of 40, 50, and 75 percent by volume, respectively, the rates of change in impedance are −42.4%, −38.2%, and −36.9%, respectively. These samples have excellent rates of change of 50% or less. The self-resonant frequencies of the samples 4, 5, and 6 do not substantially shift as shown in FIGS. 7, 8, and 9, respectively.

That is, forming pores in a ceramic body and filling at least approximately 40 percent of the total volume of the pores with the resin can achieve a substantially unchanged self-resonant frequency in the presence of a superimposed direct current, effective noise removal, and a rate of decrease in impedance of about 50 percent or less.

Such effects by forming the pores may be attributed to the following reasons.

When a magnetic field induced by a current is applied to ferrite, magnetic domain walls move so as to increase the volume of magnetic domains which are magnetized along the direction of the applied magnetic field, finally resulting in a single magnetic domain. Then, rotation magnetization brings about magnetic saturation, thus causing the decrease in magnetic permeability. As a result, inductance L decreases.

Further reduction of the rate of decrease in impedance by filling the pores with the resin may be attributed to the following reasons: Since the direction of strain produced by residual stress caused by curing the resin in the pores fixes the direction of magnetization, rotation magnetization hardly occurs in the presence of a superimposed direct current. As a result, the magnetization saturation is difficult to reach, thus, causing the suppression of a decrease in inductance. Consequently, a decrease in impedance is suppressed.

However, in fact, filling the pores with the resin decreases the impedance in the absence of a superimposed direct current. Generally, when magnetic substances are subjected to strain, the magnetic permeability varies. This is known as magnetostriction. In preferred embodiments of the present invention, curing the resin in the pores causes the resin to shrink, thus producing the residual stress. This residual stress causes the magnetostriction, thus decreasing magnetic permeability. As a result, the impedance decreases in the absence of a superimposed direct current. However, one of the advantages achieved by preferred embodiments of the present invention is suppressing and minimizing the rate of decrease in impedance in the presence of a superimposed direct current. Therefore, this advantage is achieved.

The monolithic ceramic electronic components according to the present invention are not restricted to preferred embodiments described above, and it can be variously modified within the scope of the present invention.

In particular, any composition of the ceramic material can be used. A variety of resins can also be used for filling the pores in addition to the epoxy resin. Besides the chip inductors described in the preferred embodiments, the present invention can be widely applied to electronic components such as LC combined electronic components, LR combined electronic components, and LCR combined electronic components.

While the present invention has been described with reference to what are presently considered to be the preferred embodiments, it is to be understood that the invention is not limited to the disclosed preferred embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A monolithic ceramic electronic component, comprising:

a ceramic body;

an inner electrode provided in the ceramic body, the ceramic body having pores, at least 40 percent of the total volume of the pores being filled with a resin; and the ceramic body has a porosity of greater than about 30 percent and less than about 80 percent by volume before being filled with the resin.

2. The monolithic ceramic electronic component according to claim 1, wherein the ceramic body includes a ferrite material.

3. The monolithic ceramic electronic component according to claim 1, wherein the resin is an epoxy resin.

4. The monolithic ceramic electronic component according to claim 1, wherein the pores in the ceramic body are formed by firing a mixture of a ceramic material, a binder, and a combustible substance capable of adhering to the binder, the combustible substance being spherical or powdery.

5. The monolithic ceramic electronic component according to claim 1, wherein the pores of the ceramic body have an average diameter of about 5 μm to about 20 μm before being filled with the resin.

6. The monolithic ceramic electronic component according to claim 1, wherein the pores of the ceramic body include open pores and closed pores.

7. The monolithic ceramic electronic component according to claim 1, wherein the monolithic ceramic component is one of an LC combined electronic component, an LR combined electronic component, and a LCR combined electronic component.

* * * * *